United States Patent [19]

Palmieri

[11] Patent Number: 4,506,961

[45] Date of Patent: Mar. 26, 1985

[54] EYEGLASS POSITIONING APPARATUS

[76] Inventor: Anthony L. Palmieri, 15581 Hanover, Allen Park, Mich. 48101

[21] Appl. No.: 531,079

[22] Filed: Sep. 12, 1983

[51] Int. Cl.³ .......................... G02C 5/12; G02C 5/04
[52] U.S. Cl. ..................................... 351/137; 351/128
[58] Field of Search ................. 351/88, 137, 128, 132, 351/136, 138; 2/445, 446

[56] References Cited

U.S. PATENT DOCUMENTS 3,304,145  2/1967  Hamm ..................................... 2/446

Primary Examiner—Rodney B. Bovernick

Attorney, Agent, or Firm—Cullen, Sloman, Cantor, Grauer, Scott & Rutherford

[57] ABSTRACT

An apparatus having one or more straps for changing the position of a pair of eyeglasses relative to the eyes of a wearer. In one embodiment, a single strap is attached to both lenses by two C-clips, preferably at the lower portion of each frame, with at least one of the C-clips being movable to raise or lower the glasses. In another embodiment, two straps partially encircle each lense and are interconnected by a movable bridge. The straps are manually rotated in opposite directions to raise and lower the movable bridge to adjust the position of the eyeglasses.

17 Claims, 5 Drawing Figures

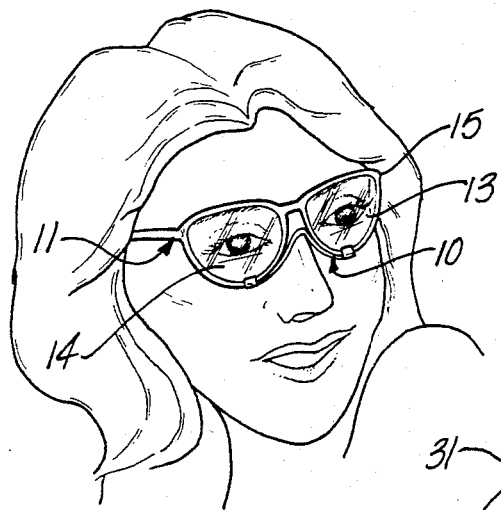
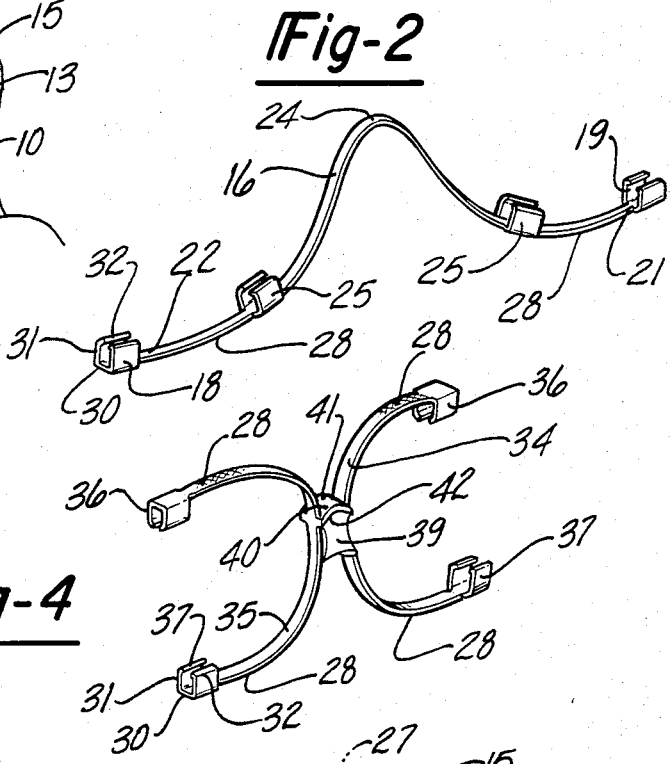
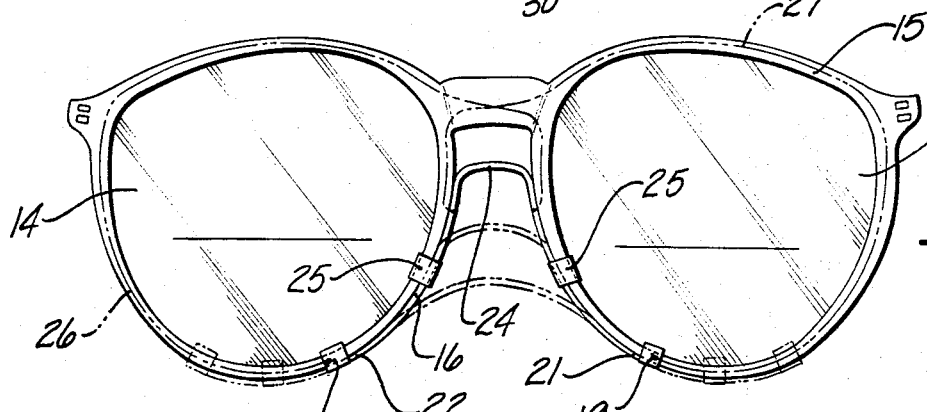
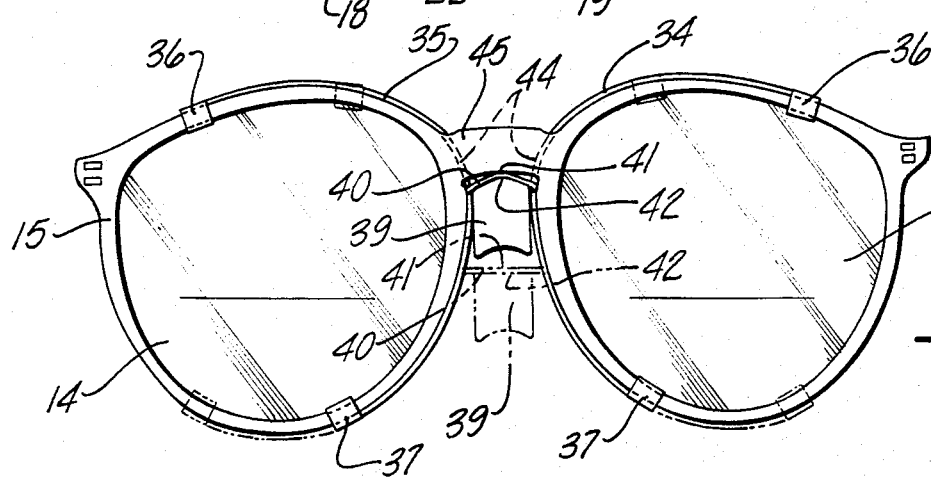

EYEGLASS POSITIONING APPARATUS

BACKGROUND OF THE INVENTION

The present invention relates to an apparatus for positioning a pair of eyeglasses relative to the eyes of a wearer. In particular, the apparatus of the present invention is especially useful for positioning bifocal and trifocal eyeglasses which have portions ground to different optical specifications.

Bifocal glasses generally include a portion on each lens of the eyeglasses for correcting far-sighted vision problems and another portion typically inset in the lower portion of the lens for correcting near-sighted vision problems. The near-sighted portion is placed in the lower region of the lens to correspond to the downward line of sight used when a person reads in a "normal position," as when a book is held on a table.

While this configuration is acceptable for many purposes, it is frequently necessary to look through the near-sighted correction portion of the lens at an object that is not conveniently viewed with a downward line of sight. For instance, when a newspaper or blueprint is held in a vertical orientation in front of a person it is most convenient to look straight ahead at the item. In such instances, a bifocal wearer typically will lift the glasses so that the near-sighted correction lens is aligned with the most convenient line of sight. Alternatively, the bifocal wearer will hold their head in a position to look through the lower portion of the bifocal lense. In either case, it is inconvenient and uncomfortable to either hold the glasses as something is being read or to hold one's head in a position to read something located in front of the wearer.

The present invention is directed to providing a simple and convenient apparatus for positioning bifocals in the most convenient line of sight for viewing a given object. Since it is impossible to anticipate the precise line of sight required to best view an object, an apparatus for positioning bifocals should be positionable throughout the range of possible viewing angles.

The apparatus of the present invention is adaptable to be either fitted to existing eyeglasses or may be included in specially designed eyeglass frames. In one embodiment of the invention, an inexpensive bifocal positioning apparatus is provided which may be easily attached to existing eyeglasses or eyeglass frames. Likewise the apparatus may be simply removed to permit it to be used when necessary and removed when unnecessary. According to another embodiment of the invention, the bifocal raising apparatus is included in the eyeglass frames as originally designed. In this way, the positioning device may be included in eyeglass frames unobtrusively.

The problem with bifocals outlined above is solved and each of the objectives and features referred to are achieved in accordance with the apparatus of the present invention.

BRIEF SUMMARY OF THE INVENTION

The present invention relates to an eyeglass positioning apparatus having at least one strap attached to the frame and/or lense of a pair of eyeglasses. The strap is attached to the eyeglasses by clips which may be moved along the frame to raise and/or lower the eyeglasses relative to the eyes of the person wearing the glasses. The strap may either support the eyeglasses directly on the nose of the person wearing the eyeglasses or may be attached to a movable bridge which in turn lies upon the nose of the person.

According to one embodiment of the present invention, a single elongate strap is attached on opposite ends by means of two clips which slidably secure the ends of the strap to the lower periphery of the eyeglass lenses. The central portion of the strap extends over a wearer's nose to locate the glasses in the proper vertical location relative to the wearer's eyes to assure that the person may conveniently look through the portion of the lenses appropriate for viewing an object at a particular distance.

As an alternative, the ends of the elongate strap may be interconnected by wires in a figure eight configuration. The wires are retained in a slot or bore in the frame and are effective to equalize adjustment of the strap.

In another embodiment of the present invention, two straps are interconnected by a movable bridge. Each strap partially encircles one of the eyeglass lenses and includes clips and/or a track for attaching opposite ends of each strap to its associated lense. The bifocal raising apparatus of this embodiment is intended to be incorporated into the frame of a pair of eyeglasses to allow the apparatus to be discretely incorporated into the eyeglass frames.

In the disclosed embodiments, the ends of the straps are secured to a C-shaped or U-shaped clip member that is specially adapted to grip the frame of a pair of eyeglasses. The gripping force must be sufficient to prevent slippage so that the glasses are supported securely, but must be limited so that the position of the glasses can be changed easily when desired.

According to one aspect of the present invention the clips and frame of the eyeglasses interact as a track and track-engaging member. Predetermined stops could be included that would facilitate positioning the glasses in one or more preferred orientations.

The concept of providing a movable bridge can be applied to either the single or double strap embodiments.

These and other features and aspects of the invention will be better understood upon studying the attached drawings in view of the following description.

BRIEF DESCRIPTION OF THE DRAWINGS

FIG. 1 is a perspective view showing a person wearing a pair of eyeglasses having one embodiment of the eyeglass positioning apparatus attached to the eyeglasses.

FIG. 2 is a perspective view showing one embodiment of the eyeglass positioning apparatus of the present invention.

FIG. 3 is an elevational view showing one embodiment of the eyeglass positioning apparatus of the present invention fitted to the frame of a pair of eyeglasses.

FIG. 4 is a perspective view of another embodiment of the eyeglass positioning apparatus of the present invention.

FIG. 5 is an elevational view of the eyeglass positioning apparatus shown in FIG. 4 attached to the frame of a pair of eyeglasses.

DETAILED DESCRIPTION

Referring to FIG. 1, one embodiment of an eyeglass positioning apparatus 10 made in accordance with the present invention is shown attached to a pair of eyeglasses 11 as worn by a person. The eyeglasses 11 are of conventional design having right and left lenses 13 and 14 which are retained in a frame 15. The right and left lenses 13 and 14 are preferably bifocal lenses which include a farsightedness correction lense portion and a nearsightedness lense portion to correct vision in two different distance ranges. It should be understood that the present invention may also be used with a trifocal or other special types of lenses.

The eyeglass positioning apparatus 10 comprises a strap 16 having first and second clips 18 and 19 attached to the right and left ends of the strap 21 and 22. The strap 16 includes a central portion 24 between the right and left ends 21 and 22. The central portion 24 is adapted to be supported on the bridge of a wearer's nose and may include a pad or bridge (not shown) attached thereto.

Referring now to FIGS. 2 and 3, the first and second clips 18 and 19 are preferably attached to the frame 15 to be slidable along the frame 15. As the first and second clips 18 and 19 are moved outwardly from the center of the eyeglasses 11 the strap 16 is straightened and moved into a position such as is shown in phantom lines in FIG. 3. The glasses are thereby raised relative to the wearer's eyes because the strap lifts the glasses by lowering the effective bridge of the glasses formed by the strap 16. The eyeglasses 11 may be returned to their lower position by sliding the first and second clips 18 and 19 toward each other and the center of the eyeglasses 11 to return the strap to the position shown in solid lines in FIG. 3. A single sliding clip with a strap fixed to the frame on one end can also be provided in accordance with the present invention.

As shown in FIGS. 1 and 2 an auxiliary clip 25 may be provided to engage the frame at a second point on each of the right and left lenses 13 and 14 to better enable the eyeglass positioning apparatus 10 to hold the eyeglasses 11 and to maintain the eyeglass positioning apparatus 10 in substantial alignment with the frame 15. The auxiliary clips 25 may be either stationary or moved with the strap 16.

As shown by dashed lines in FIG. 3, the single elongate strap 16 may have a pair of cables or wires 26 and 27 extending in a bore or slot from each clip 18, 19 around the lenses 13, 14 and back to an intermediate portion of the strap. The wires 26 and 27 may cross in the fixed bridge of the eyeglass frame to form a figure eight in combination with the strap 16. The wires 26 and 27 are effective to equalize movement of the right and left ends 21 and 22 of the strap 16. For example, when the clip 19 is moved to the right, as viewed in FIG. 3, the wire 26 connected to clip 18 is pulled to move clip 18 to the left approximately the same distance. The wires 26 and 27 also hold the strap 16 in alignment with the frame 15. When interconnected in this manner, a strong, stable adjustment mechanism is provided that evenly adjusts both lenses even if only one clip is moved.

The strap 16 and/or first and second clips 18 and 19 may include a knurled or textured surface 28 on the side of the strap opposite the frame 15. The textured surface 28 is provided to facilitate adjustment of the apparatus as it is manually moved by a wearer applying pressure with their fingers or thumbs.

The first and second clips are substantially of identical construction as will be described in detail below. The clips include a body 30 from which a pair of legs 31 extend from one side in a U-shaped or C-shaped configuration. Each of the legs 31 preferably include an inwardly extending lobe 32 which partially encircles the frame 15 to provide adequate gripping force required to hold the eyeglasses 11 in the desired position. The gripping force should not be enough to result in excessive binding against the frame 15 but must be sufficient to hold the eyeglasses in any desired position as set by the wearer.

It should be understood that various types of clips may be provided and that the clips and frame act a track engaging member and a track. The track may include various stops for setting the glasses in a predetermined position. The clips may be magnetic or have a locking member to better hold the strap in one particular position.

The single strap embodiment previously described is well suited for retrofitting to eyeglasses 11 of conventional design since it does not require any alteration of the eyeglasses and may be simply attached to the frame 15 of the eyeglasses 11.

Referring now to FIGS. 4 and 5, another embodiment of the eyeglasses positioning apparatus 10 is shown to include a right and left strap 34 and 35 which are attached to the right and left lense 13 and 14 of a pair of eyeglasses 11. Each strap includes an upper clip 36 and a lower clip 37 which are adapted to engage the frame 15 of one of said lenses at two spaced locations. The right and left straps 34 and 35 are interconnected by a bridge 39 which is movable upwardly and downwardly relative to the eyeglasses 11.

The right strap 34 as viewed in FIG. 5 rotated clockwise about the right lense 33 and the left strap 35 is rotated in a counterclockwise direction about the left lense 14 to raise the bridge 39. Conversely, lowering the bridge is effected by rotating the right and left straps 34 and 35 in the opposite direction respectively.

The bridge 39 may be connected on its top surface to a strap 40 at a midpoint 41 formed on an arcuate surface 42. In this way, the right and left straps 34 and 35 may remain substantially in contact with the frame 15 as the bridge 39 is moved downwardly to a point where the right and left lenses are spaced further apart since the strap 40 may extend directly from the right strap 34 to the left strap 35. The strap 40 in the upper position lies upon the arcuate surface 42 since the distance between the right and left lenses 13 and 14 is reduced at this point.

The right and left straps 34 and 35 may each extend through a slot 44 formed in the fixed bridge portion 45 of the frame 15 interconnecting the right and left lenses 13 and 14. The slots 44 are effective to hold the straps in the proper position on the frame 15.

IN OPERATION

In operation, the single strap eyeglass positioning apparatus 10 may be simply secured to the frame 15 of a pair of eyeglasses 11 by attaching the first and second clip 18 and 19 to the right and left lenses 13 and 14 by merely snapping the clips over a lower portion of the frame 15. The position of the eyeglasses 11 may then be adjusted by sliding the clips 18 and 19 outwardly to raise the eyeglasses relative to the eyes of the person wearing the eyeglasses so that the person can look directly through the nearsighted correction portion of the lenses at any viewing angle. The clips 18 and 19 may then be moved toward each other on the frame 15 to allow the strap 16 to move upwardly between the right and left lenses 13 and 14. The position of the eyeglasses may be set at any position between upper and lower extremes to permit the convenient viewing in any possible vertical position.

Operation of the two strap embodiment will be explained with reference to FIG. 5 wherein three different positions of the eyeglass positioning apparatus 10 are shown. The apparatus is adjusted by rotating the right and left straps 34 and 35 in opposite direction relative to one another. The uppermost position in FIG. 5 being shown in solid lines with an intermediate and lower position being shown in phantom lines to illustrate the infinite adjustability featured by the apparatus 10.

While the present invention has been disclosed in connection with the description of preferred embodiments thereof, it should be understood that there may be other embodiments which fall within the spirit and scope of the invention as defined by the following claims.

What is claimed is:

1. An eyeglass positioning apparatus for use with a pair of eye glasses having a right lense and left lense comprising:
    an elongate strap having first and second ends;
    first clip means attached to the strap on the first end for slidably securing the first end of the strap to a peripheral portion of the right lense;
    second clip means attached to the strap on the second end for slidably securing the second end of the strap to a peripheral portion of the left lense;
    said elongate strap including a central portion between the first and second ends adapted to extend over a wearer's nose;
    said first and second clip means being slidable outwardly away from the central portion to raise the eyeglasses relative to the wearer's nose, and slidable toward the central portion to lower the eyeglass relative to said wearer's eyes.

2. The eyeglass positioning apparatus of claim 1 wherein said peripheral portions of the right and left lenses include a frame extending around optical lenses.

3. The eyeglass positioning apparatus of claim 1 wherein said first and second clip means each comprise a C-shaped member.

4. The eyeglass positioning apparatus of claim 2 wherein said first and second clip means each comprise a U-shaped member having two legs with an inwardly extending lobe on the end of each of said legs for partially enclosing said frame.

5. The eyeglass positioning apparatus of claim 1 wherein:
    said first clip means includes a first track disposed on the peripheral portion of the right lense and a first track engaging member attached to the first end of the strap; and
    said second clip means includes a second track disposed on the peripheral portion of the left lense and a second track engaging member attached to the second end of the strap.

6. The eyeglass positioning apparatus of claim 1 wherein auxiliary clip means are provided on the strap between the central portion and each of the first and second clip means for slidably anchoring the strap at a second location on the peripheral portions of the right and left lenses whereby said strap is held substantially in alignment with said right and left lenses.

7. The eyeglass positioning apparatus of claim 1 wherein a pair of wires interconnect the first and second ends, respectively, to intermediate portions of the strap for equalizing adjustment of the strap.

8. The eyeglass positions apparatus of claim 7 wherein said wires are disposed in a frame extending about the right and left lenses, said frame having an opening in which the wires are movable.

9. The eyeglass positioning apparatus of claim 8 wherein the pair of wires cross in a fixed bridge portion of the frame located between the two lenses to form a figure eight pattern in combination with the strap to permit adjustment of both ends of the strap by gripping only one end thereof.

10. A bifocal raising apparatus for use with a set of eyeglasses having two lenses comprising:
    first and second elongate straps each having an upper end and a lower end;
    bridge means interconnecting said first and second straps between their upper and lower ends for engaging a wearer's nose and holding the lenses at a vertical position appropriate for viewing objects at various distances through different portions of the lenses; and
    track and track engaging means located at the upper and lower ends of each of said straps for attaching the straps to a peripheral portion of the lenses at two spaced locations.

11. The bifocal raising apparatus of claim 10 wherein said peripheral portions of the lenses include a frame extending around optical lenses.

12. The bifocal raising apparatus of claim 11 wherein said track and track engaging means each comprise a C-shaped member adapted to grip said frame.

13. The bifocal raising apparatus of claim 10 wherein said track and track engaging means each comprise a U-shaped member having two legs with an inwardly extending lobe on the end of each of said legs for partially encircling said frame.

14. The bifocal raising apparatus of claim 10 wherein said track and track engaging means comprise:
    first and second tracks located on an upper and lower peripheral portion of a right lense and first and second track engaging members attached to the upper and lower ends of the strap; and
    a third and fourth track located on an upper and lower peripheral portion of a left lense and third and fourth track engaging members attached to the upper and lower ends of the strap.

15. A bifocal eyeglass positioning apparatus comprising:
    a strap having two ends and a central portion for spanning the nose of a person wearing the eyeglasses;
    a right clip attached to one end of the strap; and
    a left clip attached to the other end of the strap, said right and left clips being attached to a frame of a pair of eyeglasses with at least one of said clips having means for permitting sliding movement along the frame to raise and lower the eyeglasses relative to the eyes of the person wearing the glasses.

16. The bifocal eyeglass positioning apparatus of claim 15 wherein said right and left clips are C-shaped members including means for gripping the frame at various positions.

17. The bifocal eyeglass positioning apparatus of claim 16 wherein said right and left clips may be manually repositioned by a bifocal wearer to enable the person to look through any portion of the eyeglasses by moving the right and left clips toward or away from each other.

* * * * *